US009485605B2

(12) United States Patent
Beran et al.

(10) Patent No.: US 9,485,605 B2
(45) Date of Patent: Nov. 1, 2016

(54) NETWORK AND SENSOR TOPOLOGY FOR A ROTORCRAFT

(71) Applicant: HONEYWELL INTERNATIONAL INC., Morristown, NJ (US)

(72) Inventors: Jan Beran, Jihomoravsky kraj (CZ); Patrik Moravek, Brno (CZ); Tomas Tesarik, Brno (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 429 days.

(21) Appl. No.: 14/501,327

(22) Filed: Sep. 30, 2014

(65) Prior Publication Data

US 2016/0165377 A1   Jun. 9, 2016

(51) Int. Cl.
*H04L 12/28* (2006.01)
*H04W 4/00* (2009.01)
*H04Q 9/00* (2006.01)
*H04L 29/08* (2006.01)
*H04W 24/00* (2009.01)
*H04W 84/18* (2009.01)

(52) U.S. Cl.
CPC .............. *H04W 4/005* (2013.01); *H04L 67/12* (2013.01); *H04Q 9/00* (2013.01); *H04W 24/00* (2013.01); *H04Q 2209/30* (2013.01); *H04Q 2209/40* (2013.01); *H04W 84/18* (2013.01)

(58) Field of Classification Search
USPC .................................. 370/401, 328, 254, 241
See application file for complete search history.

(56) References Cited

U.S. PATENT DOCUMENTS

| | | | |
|---|---|---|---|
| 6,366,311 B1 | 4/2002 | Monroe | |
| 8,402,844 B2 | 3/2013 | Zakrzewski et al. | |
| 2009/0211381 A1 | 8/2009 | Zakrzewski et al. | |
| 2011/0195656 A1* | 8/2011 | Owyang | H04W 64/00 455/3.01 |
| 2011/0299470 A1* | 12/2011 | Muller | H04Q 9/00 370/328 |
| 2012/0078544 A1 | 3/2012 | Lynch et al. | |
| 2012/0095622 A1* | 4/2012 | Lynch | B64C 25/00 701/3 |
| 2013/0190943 A1* | 7/2013 | Wester | G05F 5/00 700/297 |
| 2015/0363981 A1* | 12/2015 | Ziarno | H04B 1/3822 701/101 |

FOREIGN PATENT DOCUMENTS

| | | |
|---|---|---|
| DE | 102009054232 A1 | 5/2011 |
| EP | 2433866 A2 | 3/2012 |
| WO | 2012021202 A2 | 2/2012 |
| WO | 2014018288 A1 | 1/2014 |

\* cited by examiner

*Primary Examiner* — Duc C Ho
(74) *Attorney, Agent, or Firm* — Lorenz & Kopf, LLP

(57) ABSTRACT

Systems are provided for monitoring a rotorcraft. In one embodiment, a system includes at least one wireless concentrator unit. At least one wireless sensor unit communicates over a wireless connection with the at least one wireless concentrator unit. At least one first sensor communicates over a wired connection with the at least one wireless sensor unit. A monitoring system communicates over a wired connection with the at least one wireless concentrator unit.

20 Claims, 2 Drawing Sheets

NETWORK AND SENSOR TOPOLOGY FOR A ROTORCRAFT

TECHNICAL FIELD

The present disclosure generally relates to methods and systems for providing sensor information in a rotorcraft.

BACKGROUND

In rotorcraft, excess vibration can lead to premature wear and in some cases to failures in rotating components. Vibration can be either in a vertical or lateral plan (with respect to the main frame of the rotorcraft) and can be due to unequal lift produced by the main rotor blades, unequal distribution of mass in the main rotor "disk," loose components, shafts bearings or other mechanical problems.

Health and Usage Monitoring Systems (HUMS) use vibration measurements to diagnose mechanical health of the rotorcraft and to suggest possible corrective actions. In particular, the HUMS includes a Rotor Track and Balance system that tracks vibration of rotors of the rotorcraft and takes corrective action to smooth such vibration.

In order to track a state of health of the rotorcraft or its components, sensors measure conditions of the components and provide sensor data to the HUMS. For example, a tachometer and accelerometers are placed in close proximity to a rotor and remotely from the HUMS. The accelerometers sense vibration due to the rotor and the tachometer detects angular speed and phase of the rotor and generate sensor data based thereon. The sensor data is typically sent to the HUMS over a wire or wires that stretch from the sensors to the HUMS. These wires can be heavy, costly, and prone to failures.

Hence, there is a need for improved systems and methods for providing sensor data to the HUMS. Other desirable features and characteristics will become apparent from the subsequent detailed description and the appended claims, taken in conjunction with the accompanying drawings and the foregoing technical field and background.

BRIEF SUMMARY

Systems and methods are provided for monitoring a rotorcraft. In one embodiment, a system includes at least one wireless concentrator unit. At least one wireless sensor unit communicates over a wireless connection with the at least one wireless concentrator unit. At least one first sensor communicates over a wired connection with the at least one wireless sensor unit. A monitoring system communicates over a wired connection with the at least one wireless concentrator unit.

In another embodiment, a system includes a plurality of first sensors that generate first sensor data. At least one wireless sensor unit receives the first sensor data from the plurality of first sensors over a plurality of wired connections. At least one wireless concentrator unit receives the first sensor data from the at least one wireless sensor unit over a wireless connection with the at least one wireless sensor unit. At least one second sensor generates second sensor data, wherein the at least one wireless concentrator unit receives the second sensor data from the at least one second sensor. A monitoring system receives the first sensor data and the second sensor data from the at least one wireless concentrator unit over a wired connection with the at least one wireless concentrator unit.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
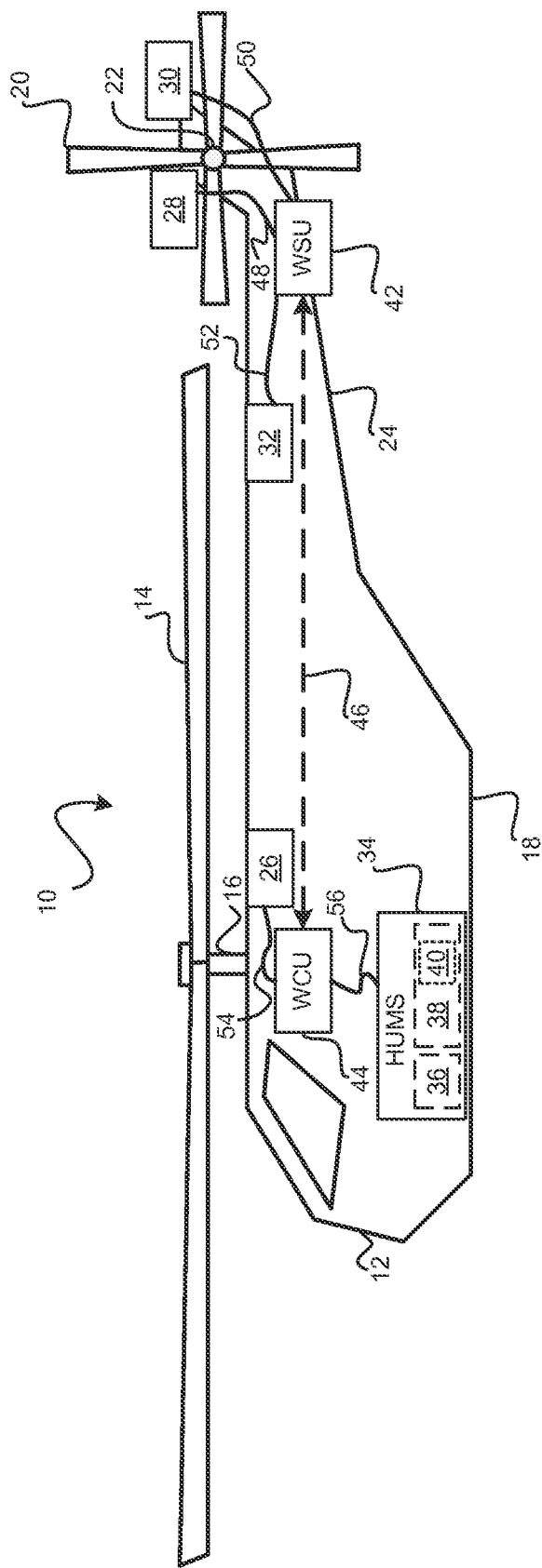
FIG. 1 is a functional block diagram illustrating a monitoring system for a rotorcraft in accordance with exemplary embodiments.

Referring now to FIG. 1, exemplary embodiments of the present disclosure are directed to a monitoring system shown generally at 10 that is associated with a rotorcraft 12. The rotorcraft 12 generally includes a plurality of blades that revolve around a mast to provide lift or thrust. For example, in one embodiment, as shown, a first set of blades 14 rotate horizontally around a mast 16 located at or near a center of a fuselage 18 of the rotorcraft 12. The blades 14 and mast 16 are collectively referred to as a main rotor. The main rotor is controlled to provide lift for the rotorcraft 12. A second set of blades 20 rotate almost vertically around a mast 22 located at or near an end of a tail 24 of the rotorcraft 12. The blades 20 and mast 22 are collectively referred to as a tail rotor. The tail rotor is controlled to provide thrust for the rotorcraft 12. As can be appreciated, various types of rotorcrafts include a varying number of rotors arranged at varying locations. As such, the monitoring system 10 of the present disclosure is not limited to the present example shown in FIG. 1.

In general, the monitoring system 10 includes sensors 26-32 that measure observable conditions of the rotorcraft 12 and that generate sensor data based thereon. The sensor data is communicated to a data processor, such as a Health and Usage Monitoring Systems (HUMS) 34. The HUMS 34 generally includes at least one processor 36 and memory 38. The memory 38 stores instructions that can be performed by the processor 36. The instructions stored in memory 38 may include one or more separate programs, each of which comprises an ordered listing of executable instructions for implementing logical functions. The processor 36 is configured to execute the instructions stored within the memory 38, to communicate data to and from the memory 38, and to generally control operations of the HUMS 34 pursuant to the instructions. The processor 36 can be any custom made or commercially available processor, a central processing unit (CPU), an auxiliary processor among several processors associated with the HUMS 34, a semiconductor based microprocessor (in the form of a microchip or chip set), a macroprocessor, or generally any device for executing instructions.

In various embodiments, the memory stores, among other things, a Rotor Track and Balance (RTB) system 40. The RTB system 40 contains instructions that, when executed by the processor 36, process the sensor data to detect and/or correct vibrations in the rotorcraft 12. As can be appreciated, the memory 38 stores other systems that contain instructions that, when executed by the processor 36, process sensor data to monitor other conditions of the rotorcraft 12. For exemplary purposes, the disclosure will be discussed in the context of the RTB system 40.

The sensor data or data associated with the sensor data is communicated from the sensors 26-32 to the HUMS 34 over a network topology that is both wired and wireless. The network topology includes at least one (if not more) wireless sensor unit (WSU) 42 and at least one (if not more) wireless concentrator unit (WCU) 44 that communicate over a wireless connection 46. For example, the WSU 42 and the WCU 44 each include transceivers that communicate data according to a wireless communication protocol (e.g., a digital signal protocol, or other protocol) over the wireless connection 46.

The WCU 44 and the WSU 42 receive data from the sensors 26-32 over wired connections. For example, the WSU 42 receives sensor data transmitted through wires 48-52 connecting the sensors 28-32 respectively with the WSU 42 according to a wired communication protocol (e.g., an analog signal protocol). In another example, the WCU 44 receives sensor data transmitted through a wire 54 connecting the sensor 26 with the WCU 44 according to a wired communication protocol (e.g., an analog signal protocol).

In various embodiments, the sensors 28-32 include accelerometers (e.g., three accelerometers) that are located proximate to the rotating blades 20 of the tail rotor of the rotorcraft 12. The accelerometers measure vibrations caused by the rotating blades 20 and send the data in a wired manner to the WSU 42. In various embodiments, the sensor 26 includes at least one tachometer that is located proximate to the rotating blades 14 of main rotor of the rotorcraft 12. The tachometer measures speed and acceleration of the rotating blades 14 and sends the data in a wired manner to the WCU 44. As can be appreciated, in various embodiments, the sensors 26-32 can be any sensors of a rotorcraft 12 and thus, the present disclosure is not limited to the examples.

The WCU 44 transmits the sensor data to the HUMS 34 over a wired connection 56. The RTB system 40 of the HUMS 34 processes the sensor data to detect and/or correct vibration in the rotorcraft 12. Alternatively, the WCU 44 processes the sensor data and transmits results of the processing over the wired connection 56 to the HUMS 34.

Figure 2:
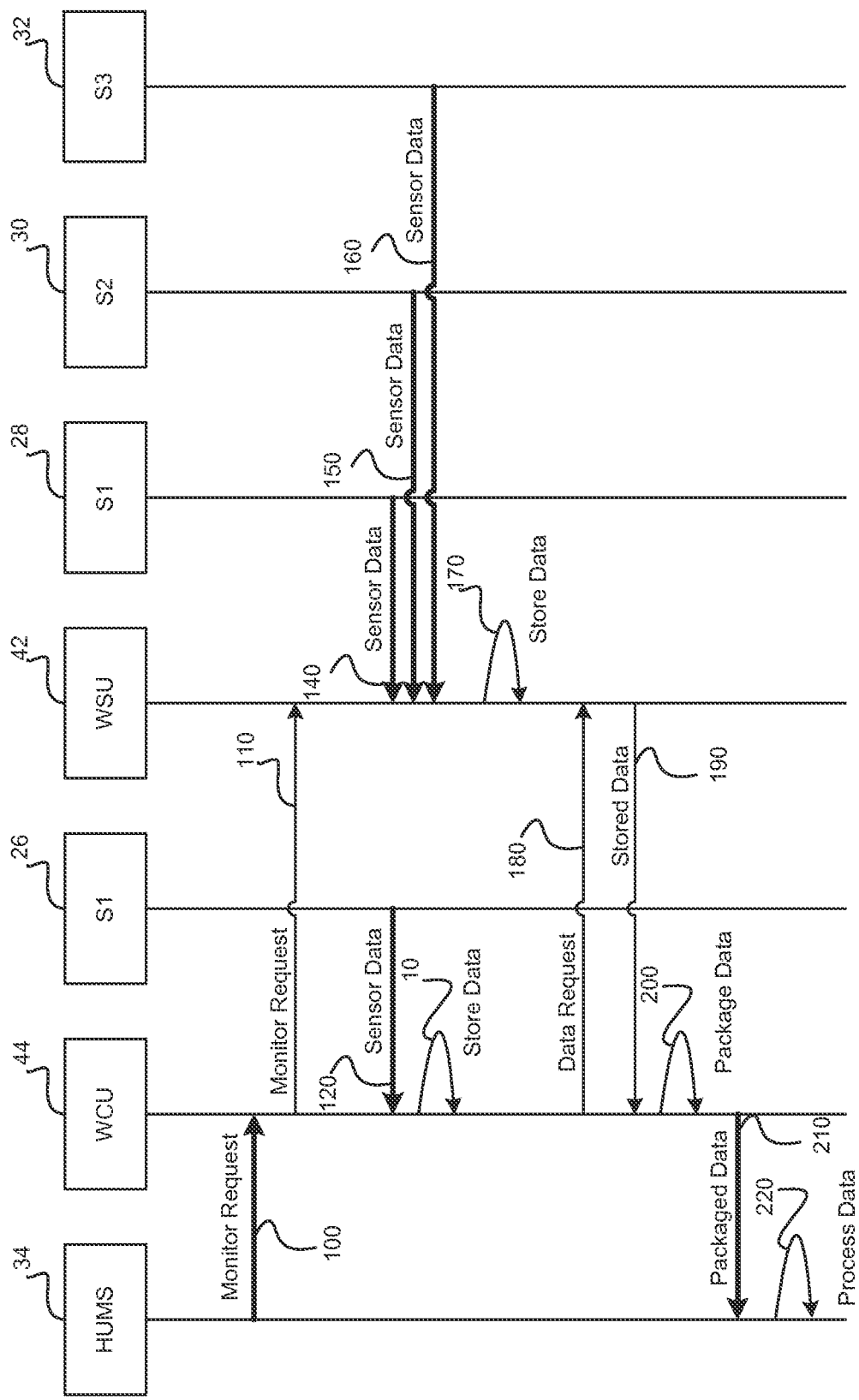
FIG. 2 is a sequence diagram illustrating a method that may be performed by the monitoring system in accordance with exemplary embodiments.

Referring now to FIG. 2, a sequence diagram illustrates a communication method that may be performed by the monitoring system 10 in accordance with various embodiments. As shown in the sequence diagram, the bolded arrows illustrate communications that are communicated over a wired connection and the unbolded arrows illustrate communications that are communicated over a wireless connection, that is, communications communicated according to a wireless communication protocol over a wireless communication medium.

As can be appreciated in light of the disclosure, the order of operation within the methods is not limited to the sequential execution as illustrated in FIG. 2, but may be performed in one or more varying orders as applicable and in accordance with the present disclosure. As can further be appreciated, one or more steps of the methods may be added or removed without altering the spirit of the method.

At 100, the HUMS 34 sends a request to monitor data to the WCU 44 according to a wired communication protocol. For example, scheduled monitoring of the vibration may occur in the HUMS 34 and the HUMS 34 sends the request to monitor based on the scheduled monitoring. At 110, the WCU 44 receives the request and transmits the request to monitor data to the WSU 42 according to a wireless communication protocol.

In response to the received request, the WCU 44 monitors data received from the sensor 26 (e.g., the tachometer) over the wired connection. For example, the WCU 44 turns on the sensor 26 and the sensor 26 generates X samples over Y time period and transmits the samples as an analog signal to the WCU 44 at 120. The WCU 44 receives the signals, converts the signals from analog to digital, and stores the converted signals in temporary storage at 130. As can be appreciated, in various other embodiments (not shown), the sensor 26 can be a digital sensor that generates digital signals that need not be converted.

Approximately simultaneously (or in a manner that is able to be synchronized with the operations of the WCU 44 and the sensor 26), in response to the received request, the WSU 42 monitors data received from the sensors 28-32 (e.g., the accelerometers) over a wired connection. For example, the WSU 42 turns on the sensors 28-32 and the sensors 28-32 generate X samples over Y time period and transmit the samples as an analog signal at 140-160 to the WSU 42. The WSU 42 receives the signals, converts the signals from analog to digital, and stores the signals in a temporary storage at 170. As can be appreciated, in various other embodiments (not shown), the sensors 28-32 can be digital sensors that generates digital signals that need not be converted.

Thereafter, WCU 44 sends a request for the stored data at 180 according to a wireless communication protocol. The WSU 42 receives the request and in response transmits the stored data to the WCU 44 according to a wireless communication protocol at 190. The WCU 44 receives the transmitted data, packages the transmitted data with the stored data from the sensor 26 at 200, and transmits the packaged data to the HUMS 34 at 210. The HUMS 34 processes the packaged data at 220, for example, using the RTB system 40 (FIG. 1). Alternatively, (flow not shown), the WCU 44 may process the packaged data before transmitting to the HUMS 34 or as an alternative to transmitting to the HUMS 34.

As can be appreciated, the steps of the method may be repeated any number of times based on a need for data of scheduled monitoring. As can be appreciated, instead of monitoring and transmitting the data from the WCU 44 to the HUMS 34 in response to a request from the HUMS 34, in alternative embodiments, the monitoring and/or transmission can be based on an occurrence of an event or a scheduled time.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for monitoring a rotorcraft, comprising:
   at least one wireless concentrator unit;
   at least one wireless sensor unit that communicates over a wireless connection with the at least one wireless concentrator unit;
   at least one first sensor that communicates over a wired connection with the at least one wireless sensor unit; and
   a monitoring system that communicates over a wired connection with the at least one wireless concentrator unit.

2. The system of claim 1 further comprising at least one second sensor that communicates over a wired connection with the at least one wireless concentrator unit.

3. The system of claim 2 wherein the at least one second sensor is a tachometer.

4. The system of claim 2 wherein the at least one second sensor communicates second sensor data to the at least one wireless concentrator unit and the at least one wireless concentrator unit stores the second sensor data.

5. The system of claim 4 wherein the at least one second sensor communicates the second sensor data to the at least one wireless concentrator unit based on at least one of a request received from the monitoring system and a trigger event.

6. The system of claim 4 wherein the at least one wireless sensor unit communicates first sensor data generated by the at least one first sensor to the at least one wireless concentrator unit over the wireless connection with the at least one wireless concentrator unit.

7. The system of claim 6 wherein the at least one wireless sensor unit communicates the first sensor data to the at least one wireless concentrator unit based on at least one of a request received from the monitoring system and a trigger event.

8. The system of claim 6 wherein the at least one wireless concentrator unit packages the second sensor data with the first sensor data and communicates the packaged data to the monitoring system over the wired connection with the at least one wireless concentrator unit.

9. The system of claim 1 wherein the at least one first sensor is an accelerometer.

10. The system of claim 1 wherein the at least one first sensor communicates sensor data to the at least one wireless sensor unit over the wired connection with the at least one wireless sensor unit.

11. The system of claim 10 wherein the at least one first sensor communicates the sensor data to the at least one wireless sensor unit based on a request received from the monitoring system.

12. The system of claim 11 wherein the at least one wireless sensor unit receives the sensor data, and stores the sensor data.

13. The system of claim 12 wherein the at least one wireless sensor unit communicates the sensor data to the at least one wireless concentrator unit over the wireless connection with the at least one wireless concentrator unit.

14. The system of claim 13 wherein the at least one wireless sensor unit communicates the sensor data to the at least one wireless concentrator unit based on a request received from the at least one wireless concentrator unit.

15. The system of claim 1 wherein the at least one wireless concentrator unit receives sensor data generated by the at least one first sensor from the at least one wireless sensor unit over the wireless connection and communicates the sensor data to the monitoring system over the wired connection with the at least one wireless concentrator unit.

16. A system for monitoring a rotorcraft, comprising:
a plurality of first sensors that generate first sensor data;
at least one wireless sensor unit that receives the first sensor data from the plurality of first sensors over a plurality of wired connections;
at least one wireless concentrator unit that receives the first sensor data from the at least one wireless sensor unit over a wireless connection with the at least one wireless sensor unit;
at least one second sensor that generates second sensor data, wherein the at least one wireless concentrator unit receives the second sensor data from the at least one second sensor; and
a monitoring system that receives data associated with the first sensor data and the second sensor data from the at least one wireless concentrator unit over a wired connection with the wireless concentrator unit.

17. The system of claim 16 wherein the plurality of first sensors include a plurality of accelerometers.

18. The system of claim 16 wherein the at least one second sensor includes a tachometer.

19. The system of claim 16 wherein the monitoring system includes a rotor track and balance system that evaluates the first sensor data and the second sensor data.

20. The system of claim 16 wherein the at least one wireless concentrator unit sends a request for data to the at least one wireless sensor unit and wherein the at least one wireless sensor unit sends the first sensor data to the at least one wireless concentrator unit over the wireless connection in response to the request.

* * * * *